United States Patent
He et al.

(10) Patent No.: US 12,507,283 B2
(45) Date of Patent: Dec. 23, 2025

(54) CHANNEL TRANSMISSION METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Chuanfeng He, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 533 days.

(21) Appl. No.: 17/487,320

(22) Filed: Sep. 28, 2021

(65) Prior Publication Data

US 2022/0015153 A1  Jan. 13, 2022

Related U.S. Application Data

(63) Continuation of application No. PCT/CN2019/080234, filed on Mar. 28, 2019.

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ........... H04W 74/0833; H04W 74/006; H04W 74/008; H04W 74/085; H04W 74/00;
(Continued)

(56) References Cited

U.S. PATENT DOCUMENTS 8,111,656 B2   2/2012  Che
2009/0303896 A1* 12/2009 Che ..................... H04W 74/006
370/252
(Continued)

FOREIGN PATENT DOCUMENTS

CN   101583196 A   11/2009
CN   107889244 A    4/2018
(Continued)

OTHER PUBLICATIONS

English translation of Korean Application No. 10-2019-0031490 (Year: 2019).*

(Continued)

*Primary Examiner* — Un C Cho
*Assistant Examiner* — Rasha K Fayed
(74) *Attorney, Agent, or Firm* — PERKINS COIE LLP

(57) ABSTRACT

A channel transmission method is provided. The channel transmission method comprises: a terminal device determines the initial position of a channel detection time window on the basis of a message sent by a network device, the initial position being positioned after a time delay after RACH timing or PUSCH timing finishes; the time delay is at least two symbols or the time delay is related to a time domain relationship of the RACH timing and PUSCH timing. Another channel transmission method, an electronic device, and a storage medium are also provided.

20 Claims, 14 Drawing Sheets

(58) Field of Classification Search
CPC ............... H04W 74/002; H04W 74/08; H04W 72/0446; H04W 72/23; H04W 72/044; H04W 72/0413; H04W 72/042; H04W 72/21; H04W 72/0453; H04W 72/04; H04W 72/046; H04W 72/1289; H04W 52/0248; H04W 76/40; H04W 56/0045; H04W 48/20; H04W 48/12; H04W 16/28; H04L 1/08; H04L 1/1614; H04L 1/18; H04L 1/1812; H04L 1/1854; H04L 1/1861; H04L 5/0048; H04L 5/0053; H04L 5/14; H04L 5/1469; H04B 7/0617; H04B 7/0695; Y02D 30/70

See application file for complete search history.

(56) References Cited

U.S. PATENT DOCUMENTS

| | | | |
|---|---|---|---|
| 2019/0069258 A1* | 2/2019 | Jeon | H04W 76/40 |
| 2019/0254078 A1* | 8/2019 | Zhang | H04W 72/0453 |
| 2019/0297537 A1* | 9/2019 | Tsai | H04W 36/0077 |
| 2019/0327764 A1* | 10/2019 | Yoo | H04L 1/18 |
| 2019/0363843 A1* | 11/2019 | Gordaychik | H04L 1/1835 |
| 2020/0205186 A1* | 6/2020 | Liu | H04W 48/12 |
| 2020/0229157 A1* | 7/2020 | Rastegardoost | H04L 5/0098 |
| 2020/0236717 A1* | 7/2020 | Sun | H04L 1/0038 |
| 2020/0260490 A1* | 8/2020 | Pang | H04L 5/0082 |
| 2020/0260500 A1* | 8/2020 | Agiwal | H04W 74/006 |
| 2021/0297966 A1* | 9/2021 | Noh | H04L 5/0092 |
| 2021/0344404 A1* | 11/2021 | Matsumura | H04W 76/19 |
| 2022/0015153 A1* | 1/2022 | He | H04W 74/0833 |
| 2022/0022242 A1 | 1/2022 | Liu et al. | |
| 2022/0132583 A1* | 4/2022 | Ko | H04W 74/0833 |
| 2022/0150982 A1* | 5/2022 | Lee | H04W 74/0866 |
| 2022/0173856 A1* | 6/2022 | Ko | H04L 5/0053 |
| 2022/0190906 A1* | 6/2022 | Haghighat | H04W 76/19 |
| 2022/0191935 A1* | 6/2022 | Xiong | H04W 74/0833 |

FOREIGN PATENT DOCUMENTS

| | | |
|---|---|---|
| KR | 20190012726 A | 2/2019 |
| WO | 2018064367 A1 | 4/2018 |
| WO | 2018143375 A1 | 8/2018 |
| WO | 2018227793 A1 | 12/2018 |
| WO | 2019029676 A1 | 2/2019 |
| WO | 2019033953 A1 | 2/2019 |

OTHER PUBLICATIONS

Second Office Action of the Chinese application No. 202111615617.0, issued on Mar. 21, 2023.
3GPP "Technical Specification Group Radio Access Network; NR; Medium Access Control (MAC) protocol specification (Release 15)", 3GPP Draft; 38321-F40, Jan. 11, 2019 (Jan. 11, 2019), XP051687001. 77 pages.
Office Action of the Indian application No. 202127047176, issued on Apr. 4, 2022. 7 pages with English translation.
Supplementary European Search Report in the European application No. 19921405.7, mailed on Feb. 18, 2022. 11 pages.
3GPP TS 38.213 V15.5.0 (Mar. 2019), "3rd Generation Partnership Project; Technical Specification Group Radio Access Network; NR; Physical layer procedures for control (Release 15)". 104 pages.
Notice of Allowance of the EP application No. 19921405.7, issued on Nov. 25, 2022. 54 pages.
First Office Action of the Japanese application No. 2021-557423, issued on Dec. 9, 2022. 6 pages with English translation.
NTT DOCOMO, Inc, "Discussion on Procedure for Two-step RACH", 3GPP TSG RAN WG1 #96 R1-1902785 Athens, Greece, Feb. 25-Mar. 1, 2019. 3 pages.
ZTE, "Summary of 7.2.1.2 Procedure for Two-step RACH", 3GPP TSG RAN WG1 #96 R1-1903436 Athens, Greece, Feb. 25-Mar. 1, 2019. 12 pages.
Vivo, "Enhance RACH with Additional Transmission Opportunities", 3GPP TSG-RAN WG2 Meeting #103bis R2-1814262 Chengdu, China, Oct. 8-12, 2018. 5 pages.
First Office Action of the Chinese application No. 202111615617.0, issued on Jan. 12, 2023. 19 pages with English translation.
Technical Specification Group Radio Access Network; "NR; Physical layer procedures for control", (Release 15), 3GPP TS 38.213 V15.2.0 (Jun. 2018).
International Search Report in the international application No. PCT/CN2019/080234, mailed on Dec. 6, 2019.
English translation of the Written Opinion of the International Search Authority in the international application No. PCT/CN2019/080234, mailed on Dec. 6, 2019.
First Office Action of the Vietnamese application No. 1-2021-06579, issued on Aug. 31, 2023, 4 pages with English translation.
Hearing Notice of the Indian application No. 202127047176, issued on Dec. 3, 2023. 2 pages with English translation.
First Office Action of the Mexican application No. MX/a/2021/011800, issued on Jul. 30, 2024, 10 pages with English translation.
First Office Action of the Korean application No. 10-2021-7034750, issued on Nov. 5, 2024. 14 pages with English translation.

* cited by examiner

| CP | preamble | CP | PUSCH | GT |

FIG. 4A

| CP | preamble | CP | PUSCH | GT |

FIG. 4B

CHANNEL TRANSMISSION METHOD, ELECTRONIC DEVICE, AND STORAGE MEDIUM

CROSS-REFERENCE TO RELATED APPLICATION

This is a continuation application of International Patent Application No. PCT/CN2019/080234, filed on Mar. 28, 2019, entitled "Channel Transmission Method, Electronic Device, and Storage Medium", the disclosure of which is hereby incorporated by reference in its entirety.

BACKGROUND

In the related art, random access includes a first type of random access and a second type of random access. For the first type of random access, there needs to perform two information interactions between a terminal device and a network device, that is, the terminal device transmits a message (Msg) A to the network device, and the network device transmits a MsgB to the terminal device. Thus, the first type of random access is also referred to as 2-steps random access (2-steps RACH). For the second type of random access, there needs to perform four information interactions between the terminal device and the network device. Thus, the second type of random access is also referred to as 4-steps random access (4-steps RACH).

In the first type of random access, since a preamble and a Physical Uplink Shared Channel (PUSCH) are included in MsgA, the network device needs to decode PUSCH. Therefore, regarding that the terminal device detects a channel carrying the MsgB at what time-frequency position or the network device transmits the channel carrying the MsgB at what time-frequency position to improve the performance of a system, there is no effective solution at present.

SUMMARY

The present disclosure relates to the field of wireless communication technologies, and more particularly, to a method and electronic device for channel transmission, and a storage medium. A terminal device determines a starting position of a time window for detecting a channel carrying a MsgB, and a network device determines a starting position of a time window for transmitting a channel carrying the MsgB. Starting to transmit a channel or to detect a channel at the starting position can reduce the power consumption of the terminal device and improve the scheduling performance of the network device.

According to a first aspect of the embodiments of the present disclosure, there is provided a method for channel transmission, the method includes that: a terminal device determines a starting position of a time window for channel detection based on a message transmitted by a network device, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

According to a second aspect of the embodiments of the present disclosure, there is provided a method for channel transmission. A network device determines a starting position of a time window for channel transmission, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

According to a third aspect of the embodiments of the present disclosure, there is provided a terminal device including a first processing unit. The first processing unit is configured to determine a starting position of a time window for channel detection based on a message transmitted by a network device, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

According to a fourth aspect of the embodiments of the present disclosure, there is provided a network device including a second processing unit.

The second processing unit is configured to determine a starting position of a time window for channel transmission, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

According to a fifth aspect of the embodiments of the present disclosure, there is provided a terminal device. The terminal device includes a processor and a memory for storing a computer program executable by the processor, herein the processor is configured to run the computer program to execute steps of the method for channel transmission executed by the terminal device.

According to a sixth aspect of the embodiments of the present disclosure, there is provided a network device. The network device includes a processor and a memory for storing a computer program executable by the processor, herein the processor is configured to run the computer program to execute steps of the method for channel transmission executed by the terminal device.

According to a seventh aspect of the embodiments of the present disclosure, there is provided a storage medium having stored thereon an executable program that, when executed by a processor, causes the processor to implement the method for channel transmission executed by the terminal device.

According to an eighth aspect of the embodiments of the present disclosure, there is provided a storage medium having stored thereon an executable program that, when executed by a processor, causes the processor to implement the method for channel transmission executed by the network device.

BRIEF DESCRIPTION OF THE DRAWINGS

FIG. 4A is a schematic diagram of a time sequential relationship between an RACH occasion and an PUSCH occasion according to the present disclosure;

FIG. 4B is a schematic diagram of another time sequential relationship between RACH occasion and PUSCH occasion according to the present disclosure;

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Before the detailed description of the method for channel transmission provided in the embodiments of the present disclosure, the RACH process is briefly described.

Figure 1:
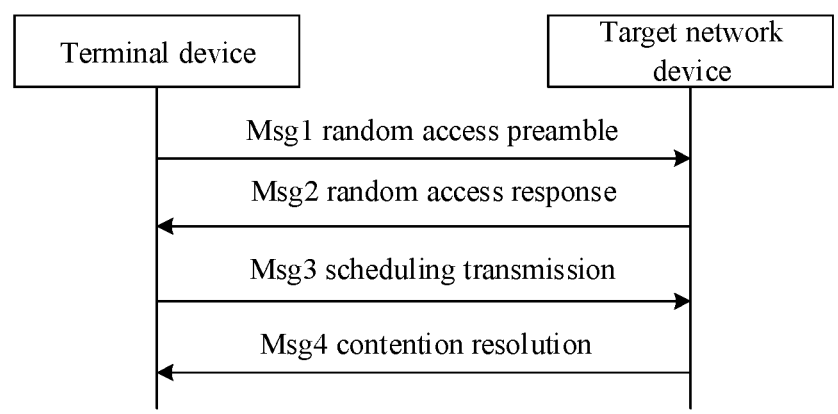
FIG. 1 is a schematic diagram of a processing flow of a second type of random access according to the present disclosure.

As illustrated in FIG. 1, the processing flow of the second type of random access includes the following four steps.

In S101, a terminal device transmits the random access preamble to a network device through a message 1 (Msg1).

The terminal device transmits a selected preamble on a selected Physical Random Access Channel (PRACH) time-domain resource. According to the preamble, the network device can estimate the uplink timing and the size of the uplink grant that is required for the terminal device to transmit a Msg3.

In S102, the network device transmits an RAR message to the terminal device through a Msg2 after having detected that the terminal device transmits the preamble, so as to inform the terminal device of uplink resource information that may be used when transmitting the Msg3, allocate a temporary Radio Network Temporary Identifier (RNTI) to the terminal device, and provide a time advance command for the terminal device.

In S103, after the RAR message is received, the terminal device transmits the Msg3 in the uplink resource specified in the RAR message.

The Msg3 is mainly configured to inform the network device that the RACH procedure is triggered by what event. For example, if it is an initial random access event, a terminal device identifier (ID) and an establishment cause are carried in the Msg3. If it is a Radio Resource Control (RRC) re-establishment event, the terminal device identifier and the establishment cause in the connected state are carried in the Msg3. If it is in an RRC connected state, the Msg3 includes a Cell-RNTI (C-RNTI) MAC CE.

Furthermore, the ID carried in the Msg3 may make a contention conflict resolved in S104.

In S104, the network device transmits a Msg4 including a contention resolution message to the terminal device, and allocates uplink transmission resources to the terminal device at the same time.

When the Msg4 transmitted by the network device is received, the terminal device detects whether the specific temporary identifier for the terminal device transmitted by the terminal device in the Msg3 is included in the contention resolution message transmitted by the base station. If the specific temporary identifier for the terminal device transmitted by the terminal device in the Msg3 is included in the contention resolution message transmitted by the base station, it indicates that the random access procedure of the terminal device is successful. If the specific temporary identifier for the terminal device transmitted by the terminal device in the Msg3 is not included in the contention resolution message transmitted by the base station, it is considered that the random access procedure fails, and the terminal device needs to initiate the random access procedure again from the first step.

Herein, resource information for transmitting the Msg1 is obtained through RACH resource configuration. In the Release 15 (Rel-15) New Radio (NR) technology, RACH resources configured for access terminal devices, including 256 configurations, are defined. The RACH resource configuration information used by a cell is indicated to the connected terminal device in a system message. The RACH resource configuration includes a preamble format, a period, a radio frame offset, a subframe number within a radio frame, a starting symbol within a subframe, a number of PRACH slots within a subframe, a number of RACH occasion within a PRACH slot, and an RACH occasion duration. Time-domain information, frequency-domain information, and code-domain information of the PRACH resource can be determined through the RACH resource configuration.

The network device indicates, through the system message, the configuration information, i.e., ra-SearchSpace, of the search space of a Physical Downlink Control Channel (PDCCH) that needs to be received by the terminal device for RAR reception. The terminal device receives the RAR corresponding to the Msg1 by detecting the PDCCH corresponding to the Msg1 in the search space within one RAR time window. Specifically, in the RAR time window, a PDCCH carrying the Downlink control information (DCI) format 1-0 is scrambled by the Random Access RNTI (RA-RNTI) and transmitted to the terminal device transmitting the Msg1. Herein the search space configured through ra-SearchSpace is Type1-PDCCH common search space. The RAR time window is configured through a high level parameter ra-ResponseWindow. The RAR time window starts at the first symbol of the nearest Control Resource Set (CORESET) which is after at least one symbol after the last symbol of the RACH occasion, and the CORESET is a CORESET configured by the ra-SearchSpace configuration information.

The configuration information for RAR time window is as follows:

Ra-ResponseWindow ENUMERATED {sl1, sl2, sl4, sl8, sl10, sl20, sl40, sl80}, where sl80 indicates that the length of the RAR window is 80 slots. The window of the RAR time window is at most 10 ms.

Figure 2:
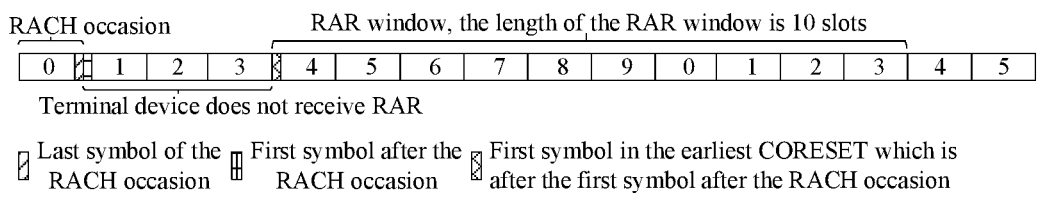
FIG. 2 is a schematic diagram of a Random Access Response (RAR) time window according to the present disclosure.

As illustrated in FIG. 2, the window size of the RAR time window is 10 slots and the subcarrier spacing is 15 kHz. The RAR time window starts at the first symbol in the earliest CORESET which is after at least one symbol after the last symbol of the PRACH occasion, and the CORESET is a time-frequency resource configured for the Type1-PDCCH common search space and configured for receiving the PDCCH.

Figure 3:
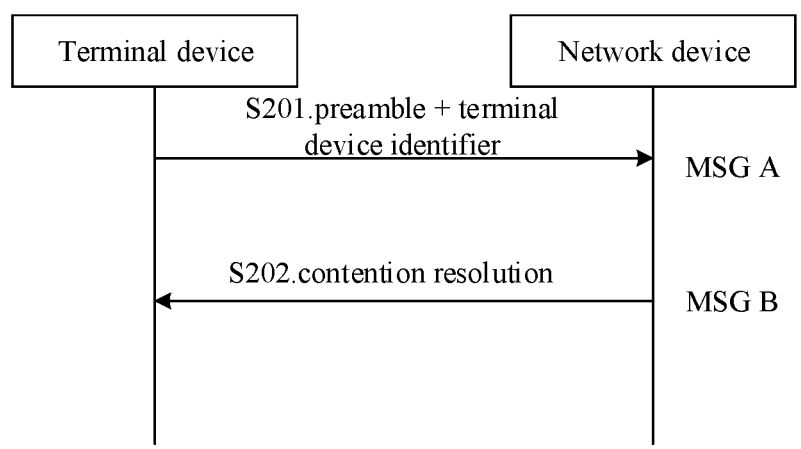
FIG. 3 is a schematic diagram of a processing flow of a first type of random access according to the present disclosure.

As illustrated in FIG. 3, the processing flow of the first type of random access includes the following two steps.

In S201, a terminal device transmits a MsgA to a network device.

Herein, the MsgA consists of a preamble and a payload. Alternatively, the preamble is the same as the preamble in the second type of random access, which is transmitted on PRACH resources; information carried in the payload is the same as the information of the Msg3 in the second type of random access, such as RRC signaling when the RRC is in the idle state and C-RNTI MAC CE when the RRC is in the connected state. The payload may be transmitted by the PUSCH. It can be understood that the MsgA includes the content of the Msg1 and the Msg3 in the second type of random access.

In S202, the terminal device receives a MsgB transmitted by the network device.

Alternatively, the MsgB includes the content of the Msg2 and the Msg4 in a second type of random access, and the MsgB needs to be transmitted by the PDCCH and the PDSCH.

Figure 4A:
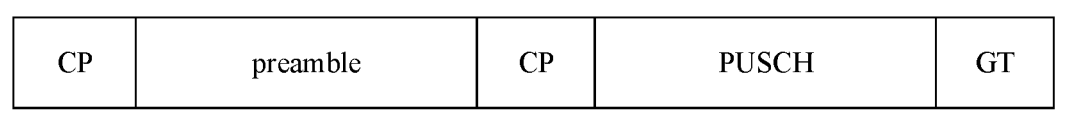
Figure 4B:
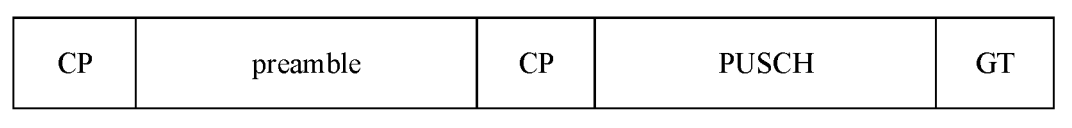

Herein, there is a correspondence between the RACH occasion in which the preamble is transmitted and the PUSCH occasion in which the PUSCH is transmitted. The correspondence may be predefined or indicated by the network device. The time sequential relationship between the RACH occasion and the PUSCH occasion may be, as illustrated in FIG. 4A, that the RACH occasion precedes the PUSCH occasion, or, as illustrated in FIG. 4B, that the PUSCH occasion precedes the RACH occasion.

In the first type of random access, after transmitting the MsgA, the terminal device needs to determine whether the MsgA is successfully received by the network device according to the result of the received MsgB, so as to decide whether to make a subsequent retransmission of the MsgA. Since the PUSCH is added into the MsgA, the network device also needs to receive and decode the PUSCH and determine the content of the MsgB according to the content of the PUSCH in addition to receiving the preamble in the MsgA. According to the method for determining the starting position of the RAR time window in the related art, it is possible that the network device cannot complete the reception and the decoding of the MsgA, and the encoding of the MsgB. As a result, the network device cannot transmit the MsgB at the early stage of the MsgB time window, but can transmit the MsgB only at the later stage of the MsgB time window, which restricts the scheduling of the network device. For the terminal device, the MsgB time window is opened prematurely, and the network device cannot transmit the MsgB in time, thereby increasing the power consumption of the terminal device.

Based on the above problem, the present disclosure provides a method for channel transmission, and the method for channel transmission according to the embodiments of the present disclosure can be applied to various types of communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a Frequency Division Duplex (FDD) system, a Time Division Duplex (TDD), a Universal Mobile Telecommunication System (UMTS), a Worldwide Interoperability for Microwave Access (WiMAX) communication system, or an 5G system.

Figure 5:
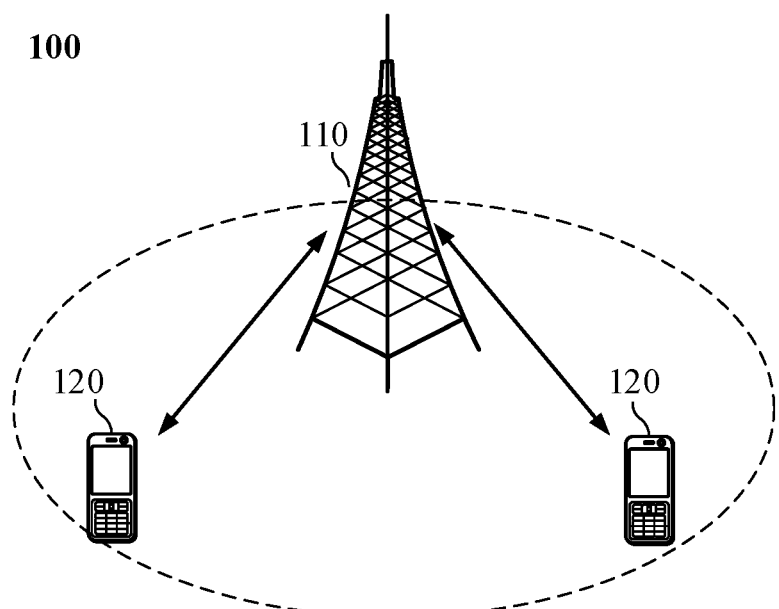
FIG. 5 is a schematic structural diagram of a communication system according to an embodiment of the present disclosure.

Illustratively, a communication system 100 applied in the embodiment of the present disclosure is illustrated in FIG. 5. The communication system 100 may include a network device 110, which may be a device that communicates with a terminal device 120 (or referred to as a communication terminal, a terminal). The network device 110 may provide communication coverage for a particular geographic area and may communicate with terminal devices located within the coverage area. Alternatively, the network device 110 may be a Base Transceiver Station (BTS) in a GSM system or a CDMA system, or may be a NodeB (NB) in a WCDMA system, or may be an Evolutional Node B (eNB or eNodeB) in an LTE system, or may be a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a Public Land Mobile Network (PLMN), or the like.

The communication system 100 also includes at least one terminal device 120 located within coverage of the network device 110. As used herein, the "terminal device" includes, but is not limited to be connected: via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another terminal device arranged to receive/transmit communication signals; and/or an Internet of Things (IoT) device. The terminal device configured to communicate through a wireless interface may be referred to as a "radio communication terminal", a "radio terminal" or a "mobile terminal". Examples of the mobile terminal include, but are not limited to: a satellite or cellular telephone; a Personal Communications System (PCS) terminal that may combine a cellular radio telephone with data processing, facsimile, and data communication capabilities; a Personal Digital Assistant (PDA) that may include a radio telephone, a pager, Internet/Intranet access, a Web browser, a notebook, a calendar, and/or a Global Positioning System (GPS) receiver; and conventional laptop and/or palmtop receivers or other electronic devices including radio telephone transceivers. The terminal device may refer to an access terminal, User Equipment (UE), a user unit, a user station, a mobile station, a mobile radio station, a remote station, a remote terminal, a mobile device, a user terminal, a terminal, a radio communication device, a user agent, or a user device. The access terminal may be a cellular telephone, a cordless telephone, a Session Initiation Protocol (SIP) telephone, a Wireless Local Loop (WLL) station, a PDA, a handheld device having a radio communication function, a computing device or other processing device connected to a radio modem, an in-vehicle device, a wearable device, a terminal device in a 5G network, a terminal device in the future evolved PLMN, or the like.

Alternatively, Device to Device (D2D) communication may be performed between the terminal devices 120.

Alternatively, the 5G system or 5G network may also be referred to as an NR system or an NR network.

FIG. 5 exemplarily illustrates a network device and two terminal devices. Alternatively, the communication system 100 may include a plurality of network devices, and another number of terminal devices may be included within the coverage area of each network device, which are not limited by the embodiments of the present disclosure.

Alternatively, the communication system 100 may further include other network entities such as a network controller, a mobility management entity, and the like, which are not limited by the embodiments of the present disclosure.

It should be understood that a device having a communication function in a network/system in the embodiments of the present disclosure may be referred to as a communication device. As an example of the communication system 100 illustrated in FIG. 5, the communication device may include a network device 110 and a terminal device 120 having a communication function. The network device 110 and the terminal device 120 may be specific devices described above, and details are not described herein. The communication device may also include other devices in the communication system 100, such as network controllers, mobility management entities, and other network entities, which are not limited in the embodiments of the present disclosure.

Figure 6:
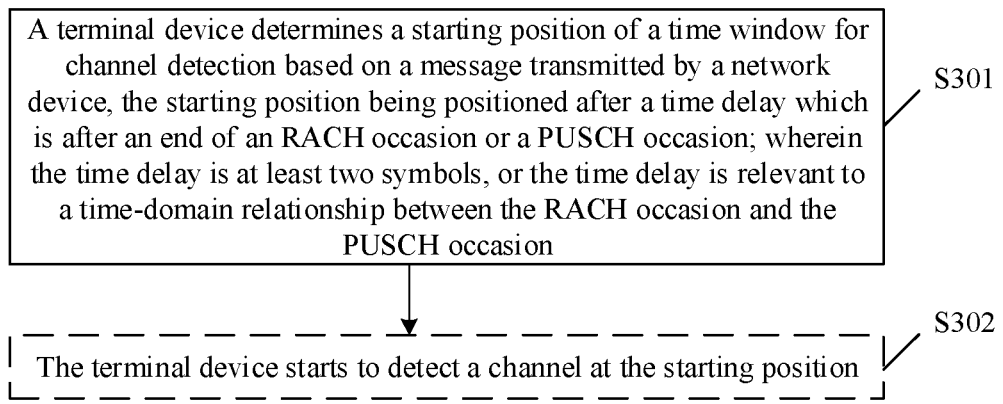
FIG. 6 is a schematic diagram of an alternative processing flow of a method for channel transmission according to an embodiment of the present disclosure.

An alternative processing flow of a method for channel transmission according to an embodiment of the present disclosure, as illustrated in FIG. 6, includes the following operations.

In S301, a terminal device determines a starting position of a time window for channel detection based on a message transmitted by a network device, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

In the embodiment of the present disclosure, the starting position is a starting position of a first symbol of a CORESET after the time delay which is after the end of the RACH occasion, or the starting position is a starting position of a first symbol of a first CORESET after the time delay which is after the end of the PUSCH occasion. Herein the CORESET is a CORESET configured for a Type1-PDCCH common search space, and the Type1-PDCCH common search space, the RACH occasion, and the PUSCH occasion are determined by the terminal device according to the message transmitted by the network device.

In a specific implementation, the terminal device may directly determine the starting position of the time window for channel detection through the message transmitted by the network device, that is, the network device transmits the starting position to the terminal device after determining the starting position of the time window for channel detection. Alternatively, the network device transmits a message to the terminal device, and the terminal device determines the starting position of the time window for channel detection according to the content carried in the message.

In some embodiments, the time delay is a fixed value. In a specific implementation, the time delay may be determined according to at least one of a processing time for PUSCH or a preparation time for PUSCH. Since the processing capabilities of the network devices manufactured by different manufacturers are different, the preparation time for PUSCH and the processing time for PUSCH are determined based on the processing time of the terminal device for PDSCH and the preparation time of the terminal device for PDSCH.

The processing capability of the terminal device for PDSCH is shown in Table 1 and Table 2 below. The preparation capability of the terminal device for PDSCH is shown in Table 3 and Table 4 below. $\mu=0, 1, 2, 3$ indicates that the subcarrier spacing of PDSCH or PUSCH is 15 KHz, 30 KHz, 60 KHz, 120 KHz, respectively.

TABLE 1

PDSCH demodulation time $N_1$ [symbols]

| $\mu$ | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
|---|---|---|
| 0 | 8 | 13 |
| 1 | 10 | 13 |
| 2 | 17 | 20 |
| 3 | 20 | 24 |

TABLE 2

PDSCH demodulation time $N_1$ [symbols]

| $\mu$ | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
|---|---|---|
| 0 | 3 | [13] |
| 1 | 4.5 | [13] |
| 2 | 9 for frequency range 1 | [20] |

TABLE 3

| $\mu$ | PUSCH preparation time $N_2$ [symbols] |
|---|---|
| 0 | 10 |
| 1 | 12 |
| 2 | 23 |
| 3 | 36 |

TABLE 4

| $\mu$ | PUSCH preparation time $N_2$ [symbols] |
|---|---|
| 0 | 5 |
| 1 | 5.5 |
| 2 | 11 for frequency range 1 |

Figure 7:
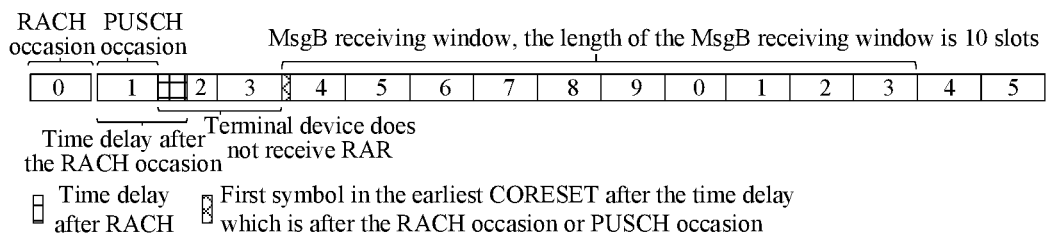
FIG. 7 is a schematic diagram of a starting position of a time window for channel detection according to an embodiment of the present disclosure.

According to the processing time for the PDSCH and the preparation time for the PUSCH as defined in the above Table 1 and Table 2, the processing time of the network device for the PUSCH can be estimated. In order to ensure sufficient processing time for the network device, a relatively conservative fixed time, such as 20 symbols, may be set. Similarly, the preparation time for PDSCH (i.e., for MsgB) can be estimated according to the preparation times for PUSCH as defined in the above Table 3 and Table 4; in order to ensure sufficient preparation time for the network device, a relatively conservative fixed time, such as 36 symbols, may be set. In fact, the processing capability of the network device is stronger than that of the terminal device, and the processing capabilities of the devices of respective manufacturers are different. The starting position of the first symbol of the nearest CORESET after N symbols after the end of the RACH occasion or the PUSCH occasion may be defined as the starting position of the MsgB receiving window. The value of N should be greater than the existing fixed time of one symbol to facilitate the reception and decoding of PUSCH in MsgA. The value of N may be any value of 2-M, and M may be a maximum value of the time required by the network device for the processing time of PUSCH and the preparation time of the MsgB. For example, M may be 20+36=56 symbols. At this time, a schematic diagram of a starting position of a time window for channel detection is illustrated in FIG. 7. The starting point of the N symbols is a time point of the end of the RACH occasion or a time point of the end of the PUSCH occasion.

When the time delay is a fixed value, before determining the starting position of the time window for channel detection, the terminal device needs to receive a message transmitted by the network device determines an RACH occasion or an PUSCH occasion based on the message transmitted by the network device, and determines a Type1-PDCCH common search space based on the message transmitted by the network device. Then, the starting position of the first symbol of the first CORESET after the time delay after the end of the RACH occasion or the PUSCH occasion is used as the starting position of the time window for channel detection. The terminal device detects the MsgB based on the starting position. Here, by setting a fixed delay, it can not only meet the processing time of the network device for PUSCH and the preparation time of the network device for PDSCH, but also reduce the power consumption of the terminal device and the implementation complexity of the network device and the terminal device.

In other embodiments, the time delay is a variable value. In a specific implementation, the time delay is determined according to a subcarrier spacing of the PDCCH or a subcarrier spacing of the PUSCH. Herein the PDCCH is a PDCCH transmitted in Type-1-PDCCH common search space. As shown in Tables 1 to 4 above, $\mu=0, 1, 2, 3$ indicates that the subcarrier spacing is 15 KHz, 30 KHz, 60 KHz, 120 KHz, respectively. Different values of $\mu$ may correspond to different time delays. For example, $\mu=0, 1, 2, 3$ corresponds to the time delay of N1, N2, N3, N4 symbols, respectively. Herein, N4>=N3>=N2>=N1. Similarly, the values of N1, N2, N3, N4 take into account the time required by the network device for the processing time of PUSCH and the preparation time of the MsgB; the respective values of N1, N2, N3 and N4 may be specified. In one manner, the values of N1, N2, N3, N4 directly refer to the PDSCH processing times for $\mu=0, 1, 2, 3$ which are defined in the PDSCH processing capability 1 of the terminal device defined in the existing standards, and the PDSCH processing times for $\mu=0, 1, 2, 3$ are used for determining the processing time of the network device for PUSCH or are directly used as the values of N1, N2, N3, N4. Similarly, the values of N1, N2, N3, N4 directly refer to the PUSCH preparation times for $\mu=0, 1, 2, 3$ which are defined in the PUSCH preparation time for PUSCH timing capability 1 of the terminal device defined in the existing standards, and the PUSCH preparation times for $\mu=0, 1, 2, 3$ are used for determining the processing time of the network device for PDSCH or are directly used as the values of N1, N2, N3 and N4.

When the time delay is a variable value, before determining the starting position of the time window for channel detection, the terminal device needs to receive a message transmitted by the network device, determines an RACH occasion or an PUSCH occasion based on the message transmitted by the network device, and determines the PDCCH based on the message transmitted by the network device. Then, the subcarrier spacing of PDCCH or the subcarrier spacing of PUSCH is determined, and the time delay is determined based on the subcarrier spacing of PDCCH or the subcarrier spacing of PUSCH. Finally, the starting position of the first symbol of the first CORESET after the time delay after the end of the RACH occasion or the PUSCH occasion is used as the starting position of the time window for channel detection. The terminal device detects the MsgB based on the starting position. Here, since different time delays can be determined for different subcarrier spacings, the time delays can be more matched with the setting of different subcarrier spacings. When the time delay is a variable value, the flexibility of time delay configuration can be increased. In such a manner, it not only meets the processing time of the network device, but also reduces the delay of the terminal device for receiving the MsgB.

Figure 8:
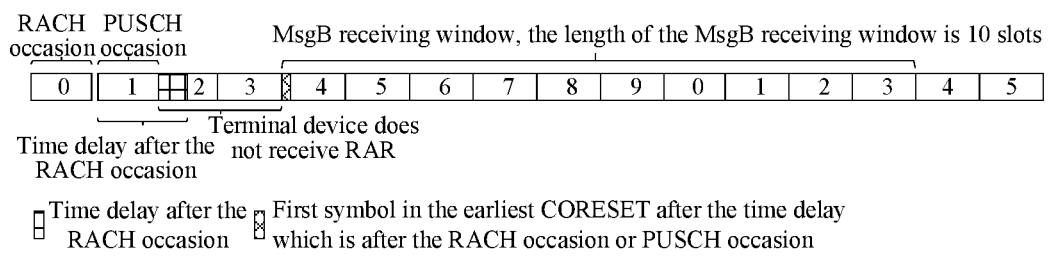
FIG. 8 is a schematic diagram of a time delay when an PUSCH occasion is before an RACH occasion according to an embodiment of the present disclosure.
Figure 9:
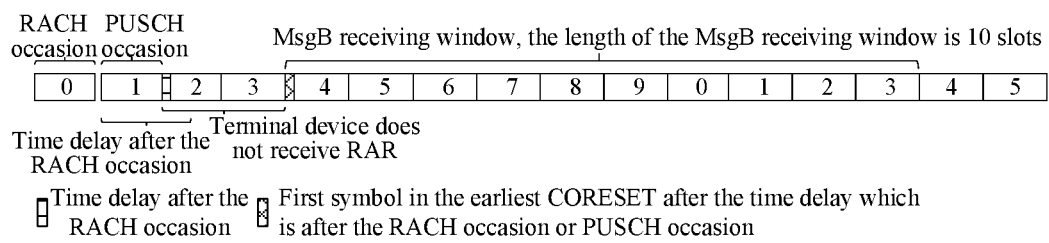
FIG. 9 is a schematic diagram of a time delay when an RACH occasion is before an PUSCH occasion according to an embodiment of the present disclosure.

In still further embodiments, the time-domain relationship between the RACH occasion and the PUSCH occasion is determined by the terminal device according to a message transmitted by the network device, or the time-domain relationship between the RACH occasion and the PUSCH occasion is preset. Herein the time-domain relationship between the RACH occasion and the PUSCH occasion includes at least one of: a time sequential relationship between the RACH occasion and the PUSCH occasion; or a time difference between the RACH occasion and the PUSCH occasion. The time sequential relationship between the RACH occasion and the PUSCH occasion may be that the RACH occasion precedes the PUSCH occasion, or the PUSCH occasion precedes the RACH occasion. The time delays for determining the starting position of the time window for channel detection are different according to the different time sequential relationships between the RACH occasion and the PUSCH occasion. If it is calculated from the time point of the end of the RACH occasion, the required time delays are different for different time sequential relationships between the RACH occasion and the PUSCH occasion. For example, when the PUSCH occasion precedes the RACH occasion, the network device has completed the demodulation of the PUSCH or the reception of the PUSCH at the end of the RACH occasion, such that the processing time required by the network device will be reduced, and the time delay will be reduced. On the contrary, when the PUSCH occasion is after the RACH occasion, the network device needs to further complete the reception and demodulation of the PUSCH at the end of the RACH occasion, such that the processing time required by the network device will be increased, and the time delay will be increased. Herein, the time delay when the PUSCH occasion is before the RACH occasion is illustrated in FIG. 8. The time delay when the RACH occasion is before the PUSCH occasion is illustrated in FIG. 9.

The effect of the time sequential relationship between the RACH occasion and the PUSCH occasion on the time delay is described above, the effect of the time difference between the RACH occasion and the PUSCH occasion on the time delay is described below. For example, when the PUSCH occasion is after the RACH occasion, the greater the time difference between the RACH occasion and the PUSCH occasion is, the greater the time delay is. The time delay is a sum of the fixed delay and the time difference between the RACH occasion and the PUSCH occasion. At this time, the starting position is positioned after the end of the RACH occasion. Herein the fixed delay is at least one symbol.

In a specific implementation, before determining the starting position of the time window for channel detection, the terminal device needs to receive a message transmitted by the network device, determines an RACH occasion or an PUSCH occasion based on the message transmitted by the network device, and determines a Type1-PDCCH common search space and a time-domain relationship between the RACH occasion and the PUSCH occasion based on the message transmitted by the network device. Then, the terminal device determines the time delay according to a time-domain relationship between the RACH occasion and the PUSCH occasion. Finally, the starting position of the first symbol of the first CORESET after the time delay after the end of the RACH occasion or the PUSCH occasion is used as the starting position of the time window for channel detection. The terminal device detects the MsgB based on the starting position. Here, different time delays can be determined for different time-domain relationships between the RACH occasion and the PUSCH occasion, so that the time delay can be set more flexibly, and the time delay can be more matched with the time-domain relationship between the RACH occasion and the PUSCH occasion. In such a manner, it not only meets the processing time of the network device, but also reduces the delay of the terminal device for receiving the MsgB.

In still other embodiments, the time delay is indicated by the network device to the terminal device through the indication information. For example, the manufacturer of the network device configures the actual time delay according to the time delay required by the network device. Alternatively, the indication information may be carried in a system message, such as configuration information related to the RACH in the system message.

In a specific implementation, before determining the starting position of the time window for channel detection, the terminal device needs to receive a message transmitted by the network device, determines an RACH occasion or an PUSCH occasion based on the message transmitted by the network device, and determines a Type1-PDCCH common search space and the time delay based on the message transmitted by the network device. Then, the starting position of the first symbol of the first CORESET after the time delay after the end of the RACH occasion or the PUSCH occasion is used as the starting position of the time window for channel detection. The terminal device detects the MsgB based on the starting position.

Here, the network device can flexibly set and indicate the time delay, and can optimally determine the starting position of the time window for channel detection. Furthermore, there is no need to detect PDCCH before the starting position, such that power consumption of the terminal device is reduced.

In addition to the above several schemes for independently determining the starting position of the time window for channel detection, the embodiments of the present disclosure can also determine the starting position of the time window for channel detection based on the combination of the above schemes for determining the starting position of the time window for channel detection.

As an example, on the basis that the time delay is a fixed delay, the time delay is further calculated according to the time-domain relationship between the RACH occasion and the PUSCH occasion. For example, when the PUSCH occasion is after the RACH occasion, the time delay is the sum of a fixed delay N1 and the time difference between the PUSCH occasion and the RACH occasion; when the PUSCH occasion is before the RACH occasion, the time delay is a fixed delay N2.

As another example, based on a defined time delay relevant to the subcarrier spacing, the time delay is further calculated according to the time-domain relationship between the RACH occasion and the PUSCH occasion. For example, when the PUSCH occasion is after the RACH occasion, the time delay is the sum of a time delay N1 corresponding to the subcarrier spacing and the time difference between the PUSCH occasion and the RACH occasion; when the PUSCH occasion is before the RACH occasion, the time delay is a time delay N2 corresponding to the subcarrier spacing.

As yet another example, in the case of different subcarrier spacings, the network device indicates different time delays. Alternatively, the value ranges of the time delays indicated by the network device are different for different subcarrier spacings.

As still another example, the network device configures time-domain relationships between the RACH occasion and the PUSCH occasion, and indicates different time delays correspondingly. Alternatively, the value ranges of the time delays indicated by the network device are different for different time-domain relationships between the RACH occasion and the PUSCH occasion.

In an embodiment of the disclosure, the method further includes:

In S302, the terminal device starts to detect a channel based on the starting position.

It should be noted that the method for channel transmission according to the embodiment of the present disclosure can be applied to a channel, such as PDCCH, carrying the MsgB in the 2-steps RACH (the first type of random access). The message transmitted by the network device to the terminal device is a system message or an RRC message.

Figure 10:
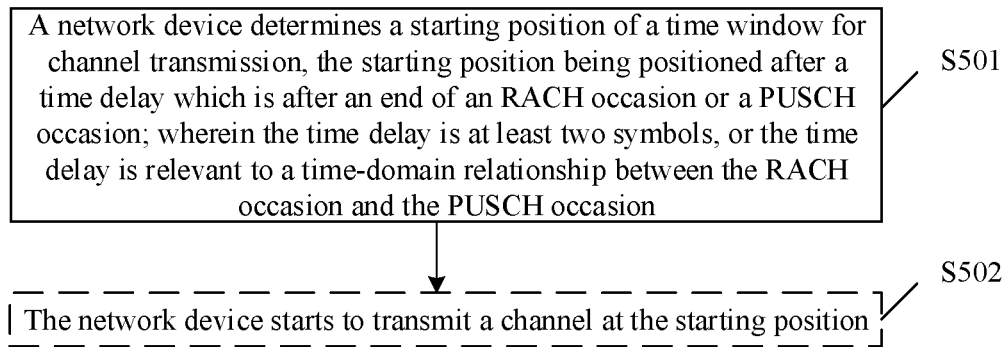
FIG. 10 is a schematic diagram of another alternative processing flow of a method for channel transmission according to an embodiment of the present disclosure.

Another alternative processing flow of a method for channel transmission according to the embodiment of the present disclosure, as illustrated in FIG. 10, includes the following operations.

In S501, the network device determines a starting position for channel transmission, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

In the embodiment of the present disclosure, the description of the network device determining the starting position of the time window for channel detection is the same as the description of the terminal device autonomously determining the starting position of the time window for channel detection according to the message transmitted by the network device in S501 of the above embodiment, and details are not described herein.

In an embodiment of the present disclosure, after performing the operation in S501, the method further includes:

in S502, the network device starts to transmit a channel based on the time window.

In a specific implementation, the channel may be transmitted at the starting position of the time window, or may not be transmitted at the starting position of the time window.

Figure 11:
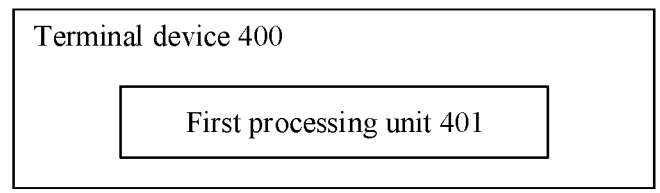
FIG. 11 is a schematic structural diagram of a terminal device according to an embodiment of the present disclosure.

In order to implement the above-described method for channel transmission, an embodiment of the present disclosure further provides a terminal device. A schematic structural diagram of the terminal device, as illustrated in FIG. 11, the terminal device 400 includes: a first processing unit 401, configured to determine a starting position of a time window for channel detection based on a message transmitted by a network device, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

In an embodiment of the present disclosure, the time delay is a fixed value. Herein the time delay is determined according to at least one of a processing time of the network device for PUSCH or a preparation time of the network device for PDSCH.

In an embodiment of the present disclosure, the time delay is a variable value. Herein the time delay is determined according to a subcarrier spacing of PDCCH or a subcarrier spacing of PUSCH.

In the embodiment of the present disclosure, the time-domain relationship between the RACH occasion and the PUSCH occasion is determined by the terminal device according to the message transmitted by the network device, or the time-domain relationship between the RACH occasion and the PUSCH occasion is preset.

In the embodiment of the present disclosure, the time-domain relationship between the RACH occasion and the PUSCH occasion includes at least one of: a time sequential relationship between the RACH occasion and the PUSCH occasion; or a time difference between the RACH occasion and the PUSCH occasion. Herein responsive to that the time-domain relationship between the RACH occasion and the PUSCH occasion is that the PUSCH occasion is after the RACH occasion, the time delay is a sum of a fixed delay and the time difference between the RACH occasion and the PUSCH occasion. The fixed delay is at least one symbol.

In the embodiment of the present disclosure, the first processing unit 401 is further configured to start to detect a channel at the starting position.

Figure 12:
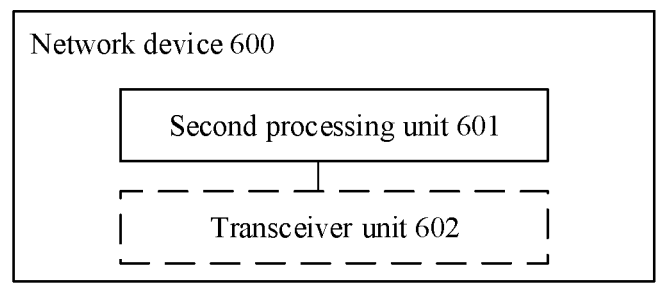
FIG. 12 is a schematic structural diagram of a network device according to an embodiment of the present disclosure.

In order to implement the above-described method for channel transmission, an embodiment of the present disclosure further provides a network device. A schematic structural diagram of the terminal device, as illustrated in FIG. 12, the network device 600 includes: a second processing unit 601, configured to determine a starting position of a time window for channel transmission, the starting position being positioned after a time delay which is after an end of an RACH occasion or a PUSCH occasion; herein the time delay is at least two symbols, or the time delay is relevant to a time-domain relationship between the RACH occasion and the PUSCH occasion.

In an embodiment of the present disclosure, the time delay is a fixed value. Herein the time delay is determined according to at least one of a processing time of the network device for PUSCH and a preparation time of the network device for PDSCH.

In an embodiment of the present disclosure, the time delay is a variable value. Herein the time delay is determined according to a subcarrier spacing of Type1-PDCCH or a subcarrier spacing of PUSCH.

In the embodiment of the present disclosure, the time-domain relationship between the RACH occasion and the PUSCH occasion is determined by the terminal device according to the message transmitted by the network device, or the time-domain relationship between the RACH occasion and the PUSCH occasion is preset.

In the embodiment of the present disclosure, the time-domain relationship between the RACH occasion and the PUSCH occasion includes at least one of: a time sequential relationship between the RACH occasion and the PUSCH occasion; or a time difference between the RACH occasion and the PUSCH occasion. Herein responsive to that the time-domain relationship between the RACH occasion and the PUSCH occasion is that the PUSCH occasion is after the RACH occasion, the time delay is a sum of a fixed delay and the time difference between the RACH occasion and the PUSCH occasion. The fixed delay is at least one symbol.

In the embodiment of the present disclosure, the network device 600 further includes a transceiver unit 602, which is configured to start to transmit a channel based on the time window. In a specific implementation, the channel may be transmitted at the starting position of the time window, or may not be transmitted at the starting position of the time window.

An embodiment of the present disclosure further provides a terminal device which includes a processor and a memory for storing a computer program executable by the processor. The processor is configured to run the computer program to execute steps of the method for channel transmission executed by the terminal device.

An embodiment of the present disclosure further provides a network device which includes a processor and a memory for storing a computer program executable by the processor. The processor is configured to run the computer program to execute steps of the method for channel transmission executed by the terminal device.

Figure 13:
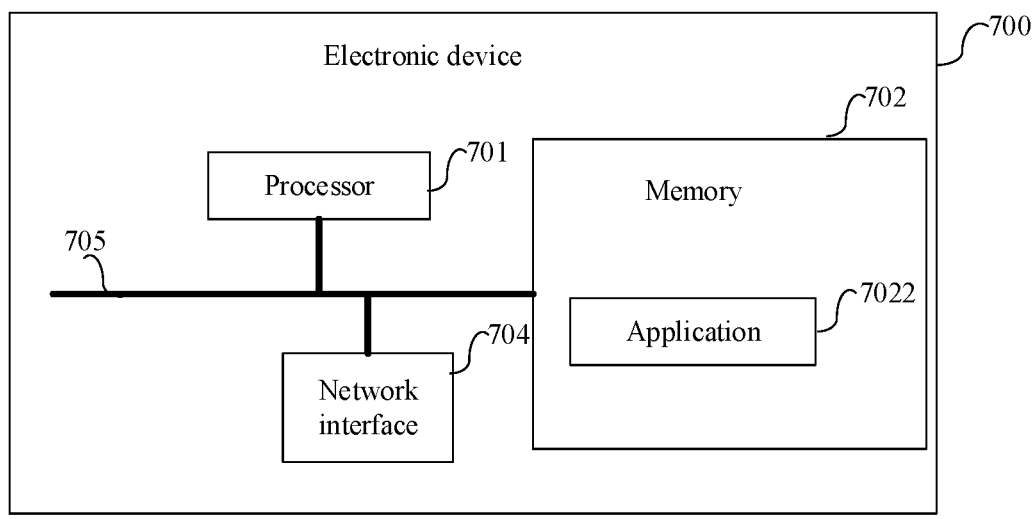
FIG. 13 is a schematic diagram of a hardware structure of an electronic device according to an embodiment of the present disclosure.

FIG. 13 is a schematic diagram of a hardware structure of an electronic device (terminal device and network device) according to an embodiment of the present disclosure. The electronic device 700 includes at least one processor 701, a memory 702, and at least one network interface 704. The various components in the terminal device 700 are coupled together through a bus system 705. It will be understood that the bus system 705 is configured to implement connection communication among these components. The bus system 705 includes a data bus and further includes a power bus, a control bus and a state signal bus. However, for clear illustration, various buses are marked as the bus system 705 in FIG. 13.

It will be understood that the memory 702 may be a volatile memory or a non-volatile memory, or may include both the volatile and non-volatile memories. Herein the non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a read-only Compact Disc Read-Only Memory (CD-ROM). The magnetic surface memory may be a magnetic disk memory or a magnetic tape memory. The volatile memory may be a Random Access Memory (RAM), which functions as an external cache. By way of exemplary but not restrictive description, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiments of the present disclosure is intended to include, but is not limited to, these and any other suitable types of memories.

The memory 702 in the embodiments of the present disclosure is used to store various types of data to support the operation of the electronic device 700. Examples of such data include any computer program for operation on electronic device 700, such as an application program 7022. A program for implementing the method of the embodiments of the present disclosure may be included in the application program 7022.

The method disclosed in the above embodiments of the present disclosure may be applied to or implemented by the processor 701. The processor 701 may be an integrated circuit chip having a signal processing capability. In an implementation, the operations of the above method may be performed by integrated logic circuits of hardware in the processor 701 or by instructions in the form of software. The processor 701 may be a general purpose processor, a Digital Signal Processor (DSP), or other programmable logic devices, a discrete gate or a transistor logic device, a discrete hardware component, or the like. The processor 701 may implement or perform the methods, operations, and logical block diagrams disclosed in the embodiments of the present disclosure. The general purpose processor may be a microprocessor or any conventional processor or the like. The operations of the method disclosed in connection with the embodiments of the present disclosure may be directly performed by a hardware decoding processor or performed by a combination of hardware and software modules in the decoding processor. The software module may be located in a storage medium located in the memory 702, and the processor 701 reads the information in the memory 702 to perform the operations of the foregoing method in conjunction with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general purpose processors, controllers, MCUs, MPUs, or other electronic components for performing the foregoing methods.

An embodiment of the present disclosure further provides a storage medium for storing a computer program.

Alternatively, the storage medium may be applied to the terminal device in the embodiments of the present disclosure, and the computer program causes the computer to execute the flows of the respective methods in the embodiments of the present disclosure. For brevity, details are not described herein.

Alternatively, the storage medium may be applied to the network devices in the embodiments of the present disclosure, and the computer program causes the computer to execute the flows of the respective methods in the embodiments of the present disclosure. For brevity, details are not described herein.

The present disclosure is described with reference to a flowchart and/or block diagram of a method, a device (system), and a computer program product according to the embodiments of the present disclosure. It is to be understood that each flow and/or block in the flow diagrams and/or block diagrams, and combinations of flow and/or block in the flow diagrams and/or block diagrams may be implemented by computer program instructions. These computer program instructions may be provided to a processor of a general purpose computer, a special purpose computer, an embedded processor, or other programmable data processing device to produce a machine such that the instructions executed by the processor of the computer or other programmable data processing device produce means for implementing the functions specified in one process or multiple processes in the flowcharts and/or one block or multiple blocks in the block diagrams.

These computer program instructions may also be stored in a computer-readable memory capable of directing a computer or other programmable data processing device to operate in a particular manner, such that the instructions stored in the computer-readable memory produce an article of manufacture including instruction means that perform the functions specified in one process or multiple processes in the flowcharts and/or one block or multiple blocks in the block diagrams.

These computer program instructions may also be loaded onto a computer or other programmable data processing device such that a series of operational operations are performed on the computer or other programmable device to produce a computer-implemented process, such that the instructions that execute on the computer or other programmable device provide operations for implementing the functions specified in one process or multiple processes in the flowcharts and/or one block or multiple blocks in the block diagrams.

The foregoing description is merely illustrative of the preferred embodiments of the present disclosure, and is not intended to limit the scope of the present disclosure. Any modifications, equivalents, and improvements that fall within the spirit and principles of the present disclosure are intended to be included within the scope of the present disclosure.

The invention claimed is:

1. A method for channel transmission, applicable to a 2-steps random access, comprising:
   determining, by a terminal device, a starting position of a time window for channel detection based on a message transmitted by a network device, the starting position being positioned after a time delay which is after an end of a Random Access Channel (RACH) occasion;
   wherein the time delay is relevant to a time-domain relationship between the RACH occasion and a Physical Uplink Shared Channel (PUSCH) occasion, and the time delay is relevant to a subcarrier spacing of Physical Downlink Control Channel (PDCCH) or a subcarrier spacing of PUSCH,
   wherein responsive to that the time-domain relationship between the RACH occasion and the PUSCH occasion is that the PUSCH occasion is after the RACH occasion, the time delay is not less than a sum of a fixed delay and the time difference between the RACH occasion and the PUSCH occasion,
   wherein the starting position is a starting position of a first symbol of a first Control Resource Set (CORESET) after the time delay which is after the end of the RACH occasion; and
   wherein the CORESET is a CORESET configured for a Type1 PDCCH common search space, and the Type1-PDCCH common search space, the RACH occasion, and the PUSCH occasion are determined by the terminal device according to the message transmitted by the network device.

2. The method of claim 1, wherein the time-domain relationship between the RACH occasion and the PUSCH occasion is determined by the terminal device according to the message transmitted by the network device, or the time-domain relationship between the RACH occasion and the PUSCH occasion is preset.

3. The method of claim 1, wherein the fixed delay is one symbol.

4. The method of claim 1, further comprising:
starting to detect, by the terminal device, a channel at the starting position.

5. The method of claim 1, wherein the channel comprises PDCCH.

6. The method of claim 1, wherein the message is a Radio Resource Control (RRC) message or a system message.

7. The method of claim 1, wherein the time delay is a non-fixed value.

8. A method for channel transmission, applicable to a 2-steps random access, comprising:
determining, by a network device, a starting position of a time window for channel transmission, the starting position being positioned after a time delay which is after an end of a Random Access Channel (RACH) occasion;
wherein the time delay is relevant to a time-domain relationship between the RACH occasion and a Physical Uplink Shared Channel (PUSCH) occasion, and the time delay is relevant to a subcarrier spacing of Physical Downlink Control Channel (PDCCH) or a subcarrier spacing of PUSCH,
wherein responsive to that the time-domain relationship between the RACH occasion and the PUSCH occasion is that the PUSCH occasion is after the RACH occasion, the time delay is not less than a sum of a fixed delay and the time difference between the RACH occasion and the PUSCH occasion, and
wherein the starting position is a starting position of a first symbol of a first Control Resource Set (CORESET) after the time delay which is after the end of the RACH occasion; the method further comprising:
determining, by the network device, a Type1 PDCCH common search space, the RACH occasion, and the PUSCH occasion, wherein the CORESET is a CORESET configured for the Type1-PDCCH common search space.

9. The method of claim 8, wherein the time delay is a non-fixed value.

10. The method of claim 8, wherein the time-domain relationship between the RACH occasion and the PUSCH occasion is preset.

11. The method of claim 8, wherein the fixed delay is one symbol.

12. The method of claim 8, wherein the channel comprises PDCCH.

13. A terminal device, comprising a processor and a memory for storing a computer program executable by the processor, wherein
the processor is configured to run the computer program to determine a starting position of a time window for channel detection based on a message transmitted by a network device, the starting position being positioned after a time delay which is after an end of a Random Access Channel (RACH) occasion;
wherein the time delay is relevant to a time-domain relationship between the RACH occasion and a Physical Uplink Shared Channel (PUSCH) occasion, and the time delay is relevant to a subcarrier spacing of Physical Downlink Control Channel (PDCCH) or a subcarrier spacing of PUSCH,
wherein responsive to that the time-domain relationship between the RACH occasion and the PUSCH occasion is that the PUSCH occasion is after the RACH occasion, the time delay is not less than a sum of a fixed delay and the time difference between the RACH occasion and the PUSCH occasion,
wherein the starting position is a starting position of a first symbol of a first Control Resource Set (CORESET) after the time delay which is after the end of the RACH occasion; and
wherein the CORESET is a CORESET configured for a Type1 PDCCH common search space, and the Type1-PDCCH common search space, the RACH occasion, and the PUSCH occasion are determined by the terminal device according to the message transmitted by the network device.

14. The terminal device of claim 13, wherein the time-domain relationship between the RACH occasion and the PUSCH occasion is determined by the terminal device according to the message transmitted by the network device, or the time-domain relationship between the RACH occasion and the PUSCH occasion is preset.

15. The terminal device of claim 13, wherein the fixed delay is one symbol.

16. The terminal device of claim 13, wherein the processor is further configured to start to detect a channel at the starting position.

17. The terminal device of claim 13, wherein the channel comprises PDCCH.

18. The terminal device of claim 13, wherein the message is a Radio Resource Control (RRC) message or a system message.

19. The terminal device of claim 13, wherein the time delay is a non-fixed value.

20. A network device, comprising a processor and a memory for storing a computer program executable by the processor, wherein
the processor is configured to run the computer program to execute steps of the method of claim 8.

* * * * *